United States Patent
Holness et al.

(10) Patent No.: US 9,025,435 B2
(45) Date of Patent: May 5, 2015

(54) OPTIMIZED SEAM ALLOCATION IN AN ETHERNET RING NETWORK

(71) Applicants: Marc Holness, Nepean (CA); Gerard S. Swinkels, Ottawa (CA)

(72) Inventors: Marc Holness, Nepean (CA); Gerard S. Swinkels, Ottawa (CA)

(73) Assignee: Ciena Corporation, Hanover, MD (US)

( * ) Notice: Subject to any disclaimer, the term of this patent is extended or adjusted under 35 U.S.C. 154(b) by 107 days.

(21) Appl. No.: 13/654,929

(22) Filed: Oct. 18, 2012

(65) Prior Publication Data

US 2014/0112123 A1 Apr. 24, 2014

(51) Int. Cl.
*G06F 11/00* (2006.01)
*H04L 12/437* (2006.01)

(52) U.S. Cl.
CPC .................................. *H04L 12/437* (2013.01)

(58) Field of Classification Search
CPC ................. H04W 40/00–40/12; H04W 40/20; H04W 40/24–40/32
USPC ......... 370/216, 217, 221, 222, 225, 226, 227, 370/228, 235, 252, 392, 401
See application file for complete search history.

(56) References Cited

U.S. PATENT DOCUMENTS

| | | | |
|---|---|---|---|
| 2006/0161659 A1* | 7/2006 | Uzun et al. | 709/225 |
| 2010/0188970 A1* | 7/2010 | Fujii et al. | 370/222 |
| 2011/0063976 A1* | 3/2011 | Birk et al. | 370/235 |
| 2012/0106369 A1* | 5/2012 | Nagasaka | 370/252 |
| 2012/0140775 A1* | 6/2012 | Kawahara et al. | 370/437 |
| 2013/0148494 A1* | 6/2013 | Abbas et al. | 370/225 |

* cited by examiner

*Primary Examiner* — Habte Mered
*Assistant Examiner* — Prince A Mensah
(74) *Attorney, Agent, or Firm* — Kent Daniels; Daniels IP Services Ltd.

(57) ABSTRACT

A method of managing a ring network. Bandwidth utilization metrics indicative of traffic flows within the network are derived. An optimal seam location is calculated based on the bandwidth utilization metrics. A channel block can be implemented at the calculated optimal seam location. The optimal seam location can be selected to balance traffic flows in the network, and can be updated as the distribution of traffic evolves over time.

17 Claims, 8 Drawing Sheets

| Connection (VLAN-ID) | BW Allocation | Path |
|---|---|---|
| AD | 100 | A-B-C-D |
| BD | 40 | B-C-D |
| BC | 10 | B-C |

| Connection VLAN-ID | BW Allocation | Path |
|---|---|---|
| AD | 100 | A-D |
| BD | 40 | B-C-D |
| BC | 10 | B-C |

Figure 5

| Connection VLAN-ID | BW Allocation | Path | | | |
|---|---|---|---|---|---|
| | | RPL=AD | RPL=AB | RPL=BC | RPL=CD |
| AD | 100 | A-B-C-D | A-D | A-D | A-D |
| BD | 40 | B-C-D | B-C-D | B-A-D | B-A-D |
| BC | 10 | B-C | B-C | B-A-D-C | B-C |

Figure 6

| Ring Seam (RPL) | Node | Transit BW | Link BW | |
|---|---|---|---|---|
| | | | E | W |
| AD | A | 0 | 100 | 0 |
| | B | 100 | 150 | 140 |
| | C | 140 | 140 | 150 |
| | D | 0 | 0 | 140 |
| AB | A | 0 | 0 | 100 |
| | B | 0 | 50 | 00 |
| | C | 40 | 40 | 50 |
| | D | 0 | 100 | 40 |
| BC | A | 50 | 50 | 150 |
| | B | 0 | 0 | 50 |
| | C | 0 | 10 | 0 |
| | D | 10 | 150 | 10 |
| CD | A | 40 | 40 | 140 |
| | B | 0 | 10 | 40 |
| | C | 0 | 0 | 10 |
| | D | 0 | 140 | 0 |

Figure 7

| Ring Seam (RPL) | AVG Transit BW | Link BW | |
|---|---|---|---|
| | | AVG | MAX |
| AD | 60 | 97.5 | 150 |
| AB | 10 | 47.5 | 100 |
| BC | 15 | 52.5 | 150 |
| CD | 10 | 47.5 | 140 |

Figure 10

| Ring Seam (RPL) | Transit BW | Link BW ||
|---|---|---|---|
| | | E | W |
| AD | 0 | 100 | 0 |
| AB | 0 | 0 | 100 |
| BC | 50 | 50 | 150 |
| CD | 40 | 40 | 140 |

OPTIMIZED SEAM ALLOCATION IN AN ETHERNET RING NETWORK

CROSS-REFERENCE TO RELATED APPLICATIONS

This is the first application filed in respect of the present invention.

FIELD OF THE INVENTION

The present application relates generally to management of communications networks, and more specifically to techniques for optimizing the Ring Protection Link (RPL) allocation in an Ethernet ring network.

BACKGROUND

Ethernet ring networks are known, for example from ITU-T recommendation G.8032. Referring to FIG. 1, an Ethernet ring is a network comprising Ethernet nodes and links connected together in a ring topology. Within the ring topology, each node is connected to a pair of links, each of which can normally support a plurality of connections. As may be seen in FIG. 1, each ring node includes a set of East ring ports connected to a corresponding East link (or segment) of the ring, a set of West ring ports connected to a corresponding West link (or segment) of the ring, a UNI port through which subscriber traffic can access the ring, a switch fabric for forwarding traffic between the ring ports and the UNI port, and a controller for controlling the ring node. It should be noted that the designation of East and West ring ports (and links) us for ease of reference only, and have no physical meaning. In FIG. 1, the East ports are indicated by the letter "E" at each node, and the West ports are indicated by the letter "W".

In order to prevent loops within the ring network, a "seam" is implemented that prevents forwarding of packets past the seam point in the ring. In ITU-T recommendation G.8032, this is accomplished by designating one of the links of the ring as a Ring Protection Link (RPL), which is disabled during normal operation of the ring by placing a channel block on that link. In some cases, the channel block can be imposed on a per-channel basis, in which case it may be permissible to designate a different RPL for each channel. However, for ease of implementation, it is common practice to designate the same PRL for all of the channels of the ring. Typically, a channel block is imposed at a node at one end of the RPL, which node may then be referred to as the RPL Owner. In some cases, the channel block may comprise a policy that prevents packets of the ring from being forwarded (or received) through a ring port connected to the RPL. In such cases, the seam that ensures loop-freeness in the ring can be considered to be localized in the ring ports in which the channel block policy is installed. In the example of FIG. 1, the channel block is imposed on link A-D of the ring by installing appropriate policies at the West ports of node "A", which is therefore the RPL Owner. With the channel block (seam) in place, the ring is guaranteed to be loop free, and conventional Ethernet MAC-learning and path computation can be used to compute and install appropriate forwarding information in each node of the ring.

An advantage of ITU-T recommendation G.8032 is that it utilizes conventional Ethernet path labelling and packet forwarding techniques to implement a ring network. However, ITU-T recommendation G.8032 contemplates that the location of the seam is selected by the network service provider as part of the process of provisioning the ring network. A limitation of this approach is that it offers no means of ensuring that the seam is optimally located to enable a desirable distribution of traffic in the ring network.

For example, FIGS. 2A and 2B show three connection mapped through the network, including: connection AD between nodes A and D via nodes B and C; connection BD, between nodes B and D via node C; and connection BC between nodes B and C. Consider a scenario in which the bandwidth allocated to each connection is: 100 for connection AD; 40 for connection BD; and 10 for connection BC. In this scenario, it may be seen that high-bandwidth connection AD transits nodes B and C solely because of the location of the seam on link A-D.

On the other hand, it may be seen that transit bandwidth resources on nodes B and C could be released, and the distribution of traffic in the network improved, if connection AD were to be routed directly between nodes A and D, as shown in FIGS. 3A and 3B. As may be seen in FIG. 3A, this improved traffic distribution could be obtained by relocating the seam to link A-B of the ring. However, without advance knowledge of the bandwidth allocation to each connection, the network service provider cannot know the optimal location for the seam. Since connections can be set up, changed, and torn down at various times, the optimal location of the seam may also change from time to time. Thus it may not even be possible to anticipate the optimal seam location during provisioning of the network.

Techniques that enable optimization of the RPL remain highly desirable.

SUMMARY

An aspect of the present invention provides a method of managing a ring network. Bandwidth utilization metrics indicative of traffic flows within the network are derived. An optimal seam point of the ring is calculated based on the bandwidth utilization metrics. A channel block can be implemented at the calculated optimal seam point.

An advantage of the present technique is that it enables the optimal seam point to be selected to balance traffic flows in the network, and can be updated as the distribution of traffic evolves over time

BRIEF DESCRIPTION OF THE DRAWINGS

Further features and advantages of the present invention will become apparent from the following detailed description, taken in combination with the appended drawings, in which:

FIG. 5 is a table showing predicted connection routes in the network of FIG. 2A, for each possible Ring Protection Link;

FIG. 6 is a table showing predicted nodal bandwidth utilization metrics for each possible Ring Protection Link;

FIG. 7 is a table showing predicted ring bandwidth utilization metrics for each possible Ring Protection Link, and selection of an optimal Ring Protection Link;

FIG. 10 is a table showing predicted nodal bandwidth utilization metrics for each possible Ring Protection Link, for ring node A of FIG. 2A.

It will be noted that throughout the appended drawings, like features are identified by like reference numerals.

DETAILED DESCRIPTION

The present application provides techniques for determining the optimal location of the seam in a ring network. For ease of description, the present techniques are described with reference to an example in which a single seam is imposed on one link of the ring, and affects all of the channels of the ring equally. However, it will be understood that the illustrated example is not limitative of the invention defined by the appended claims. If desired, the techniques described herein may be used to find a respective optimal seam location for each channel of the ring network, and the optimal seam location of one channel may be the same as or different from the optimal seam location for any other channel. For ease of description, the present techniques are described with reference to an example Ethernet ring network implemented in accordance with ITU-T recommendation G.8032. However, it will be understood that the present techniques are not limited to ITU-T recommendation G.8032, or even to Ethernet networks. Rather, it will be understood that the present techniques may be used to determine the optimal seam location in any packet network having a ring topology.

Figure 4:
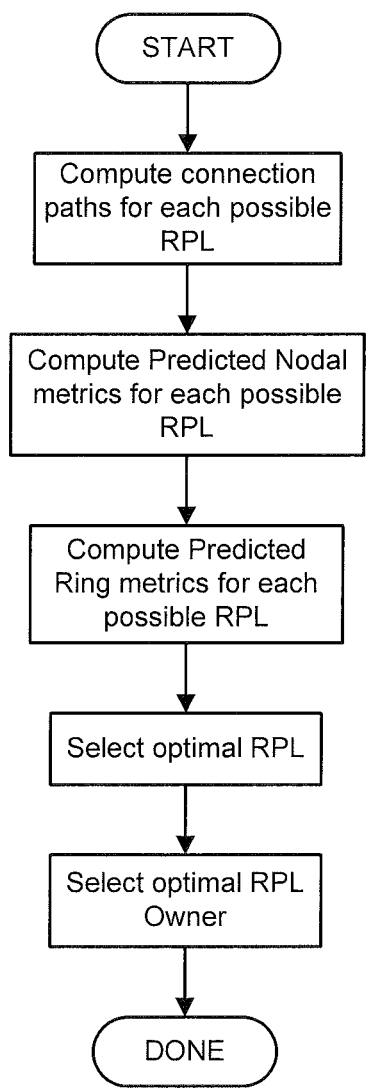
FIG. 4 is flow chart illustrating a representative method of determining an optimal seam point.

FIG. 4 is a flow chart illustrating a representative method for determining the optimal seam point in a ring network, In this case, the optimal seam point is considered to be identified by the combination of the link identifier identifying the optimum Ring Protection Link (RPL) and the node identifier identifying the optimum RPL Owner.

Figure 1:
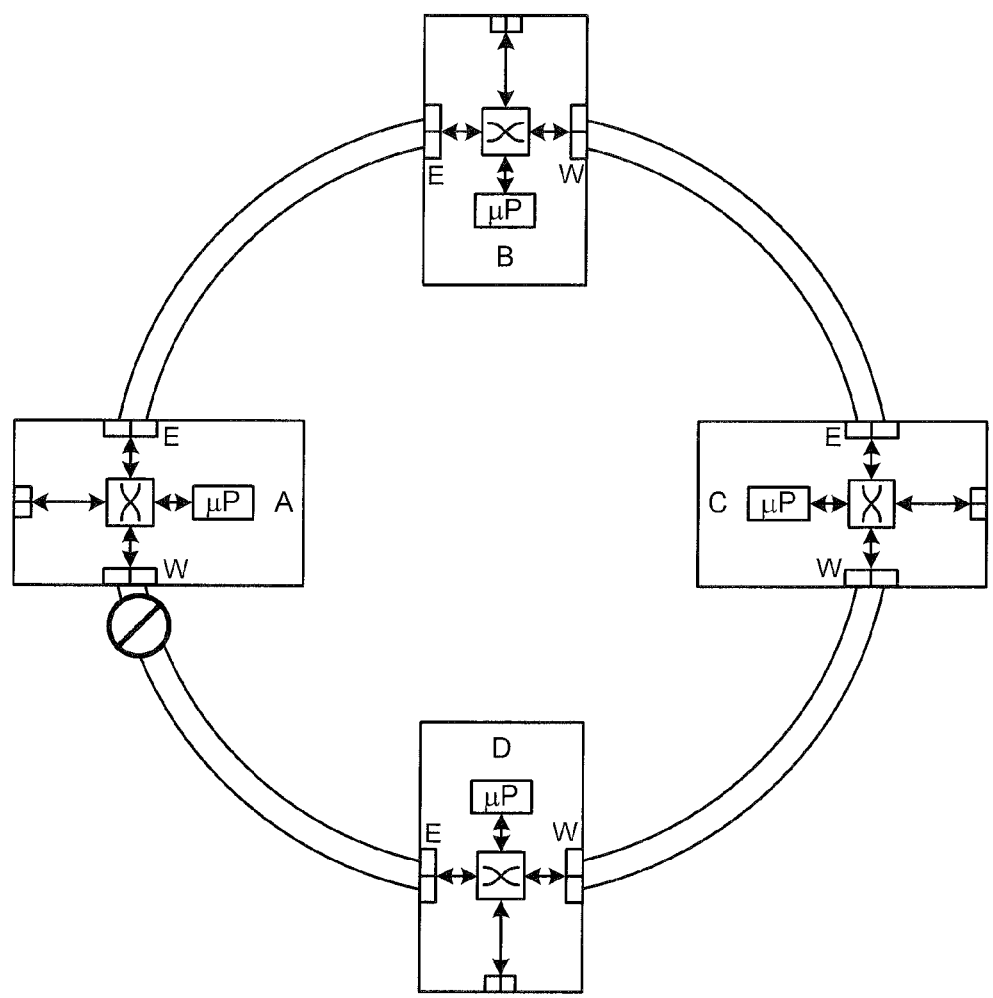
FIG. 1 is a block diagram showing a representative ring network known in the art.
Figures 2A, 2B:
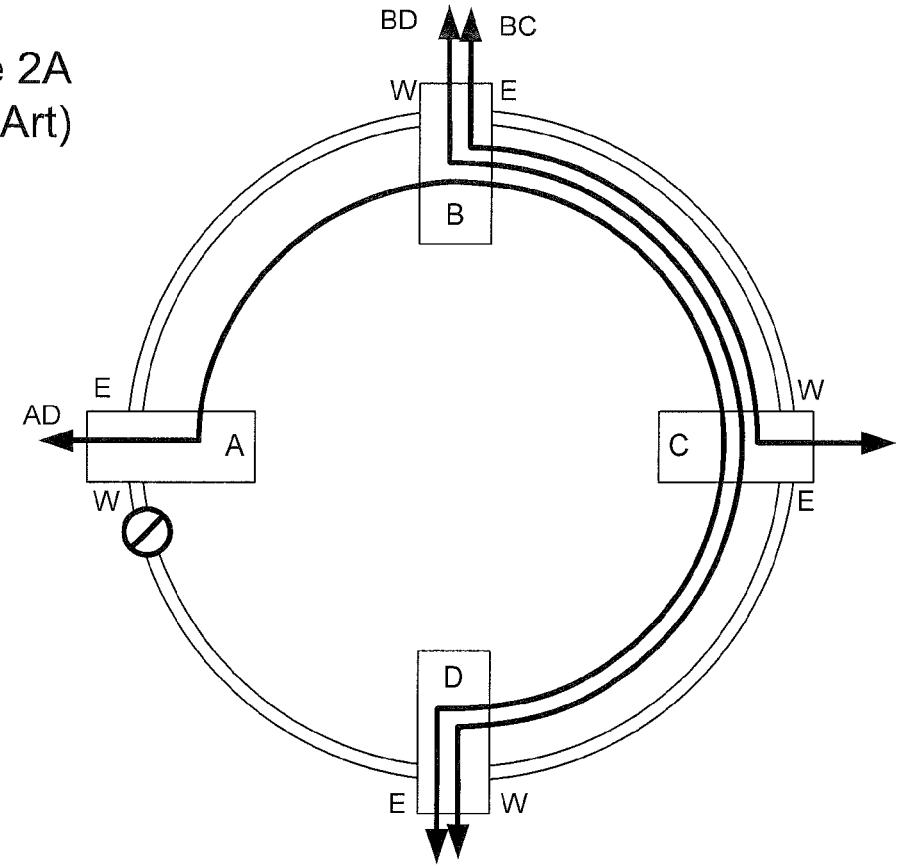
FIGS. 2A and 2B illustrate representative connections mapped through the ring network of FIG. 1.
Figures 3A, 3B:
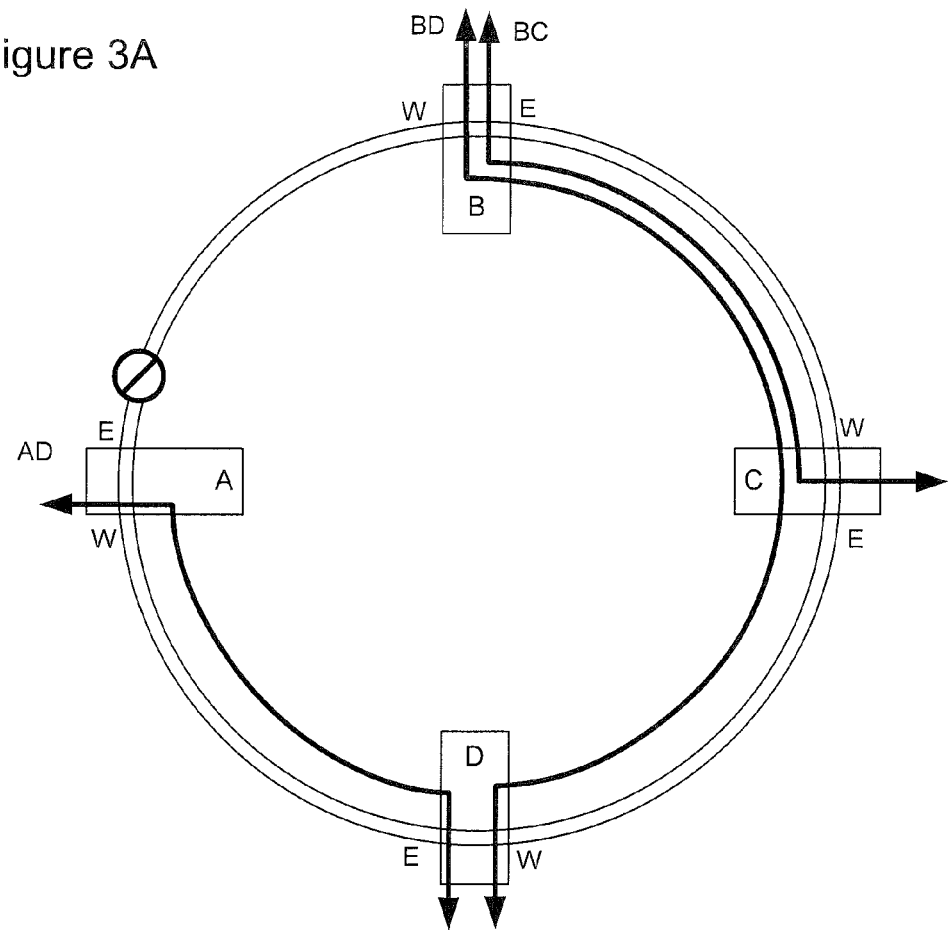
FIGS. 3A and 3B illustrate the connections of FIGS. 2A and 2B with improved traffic distribution in the ring network.

Referring to FIG. 4, at a first step, for each possible RPL, respective paths are calculated for the existing connections through the network. Thus, continuing the example of FIGS. 2 and 3, respective paths are calculated for each of the connections AD, BD and BC, for each possible RPL in the ring network. These connection paths are shown in the table of FIG. 5. The BW allocation values for each connection in the table of FIG. 5 may be derived from measured per-VLAN-ID statistics described below, or from respective bandwidth reservations implemented as part of connection set-up. In other embodiments, a Quality of Service (QoS) or DiffServe Code-Point, or any other connection attribute that is indicative of an expected bandwidth utilization of an existing connections may be used as a proxy for the BW allocation.

Conventional carrier-grade network nodes typically gather per-port and per-connection statistics, including bandwidth utilization. In the particular case of an Ethernet node, per-connection (i.e. VLAN-ID) statistics provide a direct means of determining the BW allocation for each connection in the network. This arrangement is beneficial in that that it enables the optimal RPL to be determined and adjusted based on the actual evolving traffic flows in the network.

In addition, conventional carrier-grade Ethernet nodes typically measure the total Bandwidth utilization of each of its East and West ring ports and its UNI ports. Using this data, the Node transit BW utilization can be determined as $(E+W-U)/2$, where E is the measured BW utilization of the East ring ports; W is the measured BW utilization of the West ring ports; and U is the measured BW utilization of the UNI ports. The measured values of E and W can be used directly as the East and West link BW utilization values, respectively. In some cases, per-port BW utilization values can be attributed to individual connections (i.e. VLAN-IDs) using topology and forwarding database information that is also conventionally stored in each node.

The connection information summarized in FIG. 5 can then be used to calculate a respective set of predicted Nodal BW utilization values for each possible seam location. In the illustrated embodiment, these predicted nodal BW utilization values comprise a predicted transit BW utilization and predicted East and West link BW utilization values for each possible RPL, and are summarized in the table of FIG. 6. Each of the predicted nodal BW utilization values can be derived from the per-connection BW allocation values described above.

Based on the predicted nodal BW utilization values, corresponding predicted ring metrics can be calculated for each possible seam location. These predicted nodal BW utilization values include: the average transit BW utilization across all of the nodes of the ring; the predicted average link BW utilization across all of the links of the ring; and the predicted maximum link BW utilization across all of the links of the ring. FIG. 7 is a table showing respective predicted ring metrics for each possible RPL. Using the predicted ring metrics, the optimal RPL can be determined by finding the RPL for which each of the ring metric values is a minimum. In some embodiments, the three ring metrics for each RPL may be combined (eg by summation, weighted averaging or any other suitable means) into a single composite value, and the RPL having the lowest composite value selected as the optimal RPL. In the example of FIG. 7, the minimum ring metric values (as indicated by the arrow in FIG. 7) are associated with link AB, which is therefore selected as the optimum RPL.

As will be appreciated, the optimal RPL can be implemented by installing a channel block at either end of the selected link. As such, once the optimum RPL has been selected, it is necessary to select one of the two ring nodes connected to that link as the optimal RPL Owner. Various techniques may be used to accomplish this. In one embodiment, the node having the lower node identifier is selected as the optimal RPL Owner. However, any other suitable method may be used.

Figure 8:
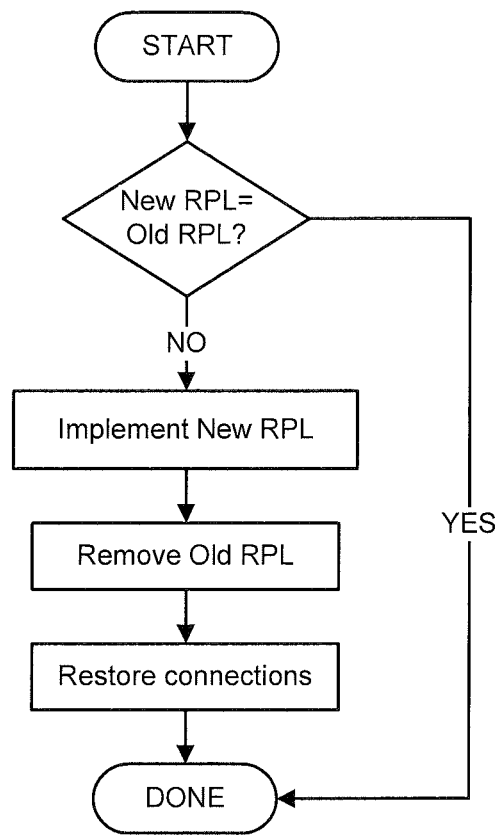
FIG. 8 is flow chart illustrating a representative method of implementing an optimal seam point.

Once the optimum RPL and RPL Owner have selected, a decision may be made regarding whether or not the existing RPL or RPL owner should be changed. While implementing the optimal RPL may have the effect improving traffic flows in the network, this step comes at a cost of interrupting every connection that is currently using the new (optimal) RPL. In the case of an ITU G.8032 Ethernet ring network, this implies a 50 mSec. interruption of service. In some cases, this may outweigh the desirability of making the change. In other cases, it may be preferable to adjust the RPL at a selected time, or in accordance with on a predetermined schedule. In some embodiments, a network service provider may want to manually control any changes in the RPL. In other embodiments, an automated solution may be preferred. FIG. 8 is a flow-chart illustrating a representative method for automatically updating the RPL.

Referring to FIG. 8, at a first step, the process determines whether the Optimal (new) RPL corresponds with the old RPL currently in place in the network. If it does, then there is no change to be made and the process terminates, even if the current RPL Owner differs from the Optimal RPL Owner as identified by the process described above with reference to FIGS. 4-7. On the other hand, if the Optimal RPL differs from the current RPL, the new (optimal) RPL Owner operates to implement the new (optimal) RPL, for example by implementing channel blocks on the applicable ring ports. Once the new RPL is in place, the Old RPL Owner can remove the channel blocks implementing the old RPL. Conventional path restoration techniques can then be used to restore the connections affected by the change in the RPL.

As may be appreciated, the processes described above with reference to FIGS. 4-8 may be implemented by a central management server (not shown) in communication with each of the ring nodes in the network. In such cases, the central management server may interact with each ring node to populate a database of connections in the network (as per FIG. 5) and then use this database to calculate the optimal seam point as described above with reference to FIGS. 6 and 7. The central management server may then interact with each of the New and Old RPL Owner nodes to implement the new RPL as described above with reference to FIG. 8.

Figure 9:
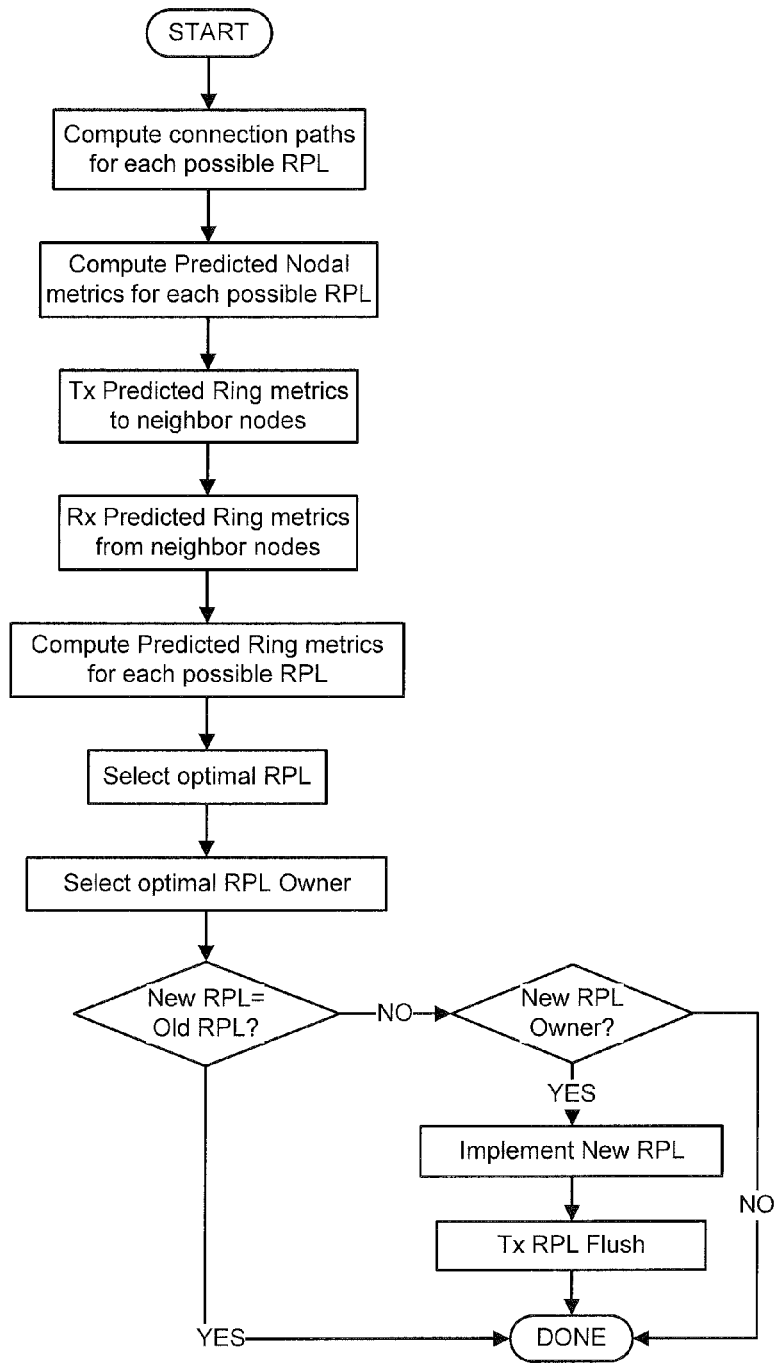
FIG. 9 is flow chart illustrating a representative distributed method of calculating and implementing an optimal seam point.

In an alternative embodiment, the processes described above with reference to FIGS. 4-8 may be implemented in a distributed manner by each of the ring nodes. In this case, each ring node may execute a process similar to that of FIG. 9. In the process of FIG. 9, each ring node uses its own topology database to compute predicted connection paths for each existing connection in the network, for each possible RPL, in a manner directly analogous to that described above with reference to FIGS. 4 and 5. Each ring node then uses these predicted connections to compute respective predicted nodal BW utilization metrics for itself only. Thus, for the example network for FIG. 2, node A (FIG. 2A) may compute its own predicted nodal metrics for each possible RPL, as may be seen in FIG. 10. Each ring node may then transmit its respective set of predicted nodal metrics to each of the other ring nodes of the network. Upon receipt of the respective nodal metrics from each of the other ring nodes in the network, each ring node may then independently compute the predicted ring metrics for each possible RPL, and then identify the optimal RPL and Optimal RPL Owner, as described above with reference to FIG. 7.

If the Optimal (new) RPL corresponds with the old RPL currently in place in the network, then there is no change to be made and the process terminates, even if the current RPL Owner differs from the identified Optimal RPL Owner. On the other hand, if the Optimal RPL differs from the current RPL, then each node determines whether or not it is the optimal RPL Owner. If it is not the optimal RPL Owner, then the node terminates its process. Accordingly, only the new RPL Owner on the ring proceeds to implement the new (optimal) RPL, for example by installing a channel block policy on the appropriate ring ports. Once the new RPL has been implemented, the new RPL Owner can then transmit an "RPL flush" message, which propagates hop by hop around the ring, until it reaches the old RPL Owner. Upon receipt of the RPL Flush message, the old RPL Owner removes the channel block implementing the old RPL, so that conventional path restoration techniques can restore any connections broken by implementation of the new RPL.

The embodiments of the invention described above are intended to be illustrative only. The scope of the invention is therefore intended to be limited solely by the scope of the appended claims.

We claim:

1. A method of managing a ring network, the method being performed by at least one node of the network and comprising:
deriving respective ring bandwidth utilization metrics for each one of a set or two or more candidate seam locations, the ring bandwidth utilization metrics being representative of a utilization of overall bandwidth resources of the network;
identifying an optimal seam location from among the set of candidate seam locations, based on the ring bandwidth utilization metrics; and
implementing a channel block at the optimal seam location;
wherein deriving ring bandwidth utilization metrics comprises, for each ring node, calculating a respective set of predicted nodal bandwidth utilization metrics for each candidate seam location in the network, the nodal bandwidth utilization metrics being representative of a utilization of bandwidth resources of each ring node, and calculating a set of ring bandwidth utilization metrics for each candidate seam location in the network, based on the nodal bandwidth utilization metrics.

2. The method of claim 1 wherein the optimal seam location is different from an existing seam location, and wherein implementing a channel block at the optimal seam location comprises sending a message to a node corresponding to the existing seam location, the message instructing the node to release a channel block at the existing seam location.

3. The method of claim 1 wherein nodal bandwidth utilization metrics comprise, for each candidate seam location:
a transit bandwidth utilization;
a link bandwidth utilization in a first direction; and
a link bandwidth utilization in a second direction.

4. The method of claim 1 wherein ring bandwidth utilization metrics comprise, for each candidate seam location:
an average transit bandwidth utilization across all of the ring nodes of the network;
an average link bandwidth utilization across all of the links of the network; and
a maximum link bandwidth utilization.

5. The method of claim 4 wherein calculating an optimal seam location comprises selecting an optimal candidate seam location, based on the ring bandwidth utilization metrics.

6. The method of claim 5 wherein the optimal seam location is selected as the candidate seam location for which the ring bandwidth utilization metrics are a minimum.

7. The method of claim 1 wherein each ring node of the network calculates its respective nodal bandwidth utilization metrics, and wherein the method further comprises each ring node transmitting its respective nodal bandwidth utilization metrics to each of the other ring nodes of the network.

8. The method of claim 7 further comprising steps of:
each ring node receiving respective nodal bandwidth utilization metrics from each of the other ring nodes of the network; and
each ring node calculating a respective set of ring bandwidth utilization metrics for each candidate seam location in the network, based on its respective nodal bandwidth utilization metrics and the nodal bandwidth utilization metrics received from each of the other ring nodes in the network.

9. The method of claim 8 wherein each ring node of the network performs the steps of:
calculating the optimal seam location;
determining whether the ring node is a new RPL Owner based on the optimal seam location; and
if the ring node is the new RPL Owner, implementing the channel block at the calculated optimal seam location.

10. A non-transitory computer readable storage medium embodying software instructions for controlling a processor of a node of a ring network to perform the steps of:

deriving respective ring bandwidth utilization metrics for each one of a set or two or more candidate seam locations within the network, the ring bandwidth utilization metrics being representative of a utilization of overall bandwidth resources of the network;

identifying an optimal seam location from among the set of candidate locations, based on the ring bandwidth utilization metrics; and implementing a channel block at the optimal seam location;

wherein deriving ring bandwidth utilization metrics comprises, for each ring node, calculating a respective set of predicted nodal bandwidth utilization metrics for each candidate seam location in the network, the nodal bandwidth utilization metrics being representative of a utilization of bandwidth resources of each ring node, and calculating a set of ring bandwidth utilization metrics for each candidate seam location in the network, based on the nodal bandwidth utilization metrics.

11. A node of a ring network, the node comprising a processor configured to:

derive respective ring bandwidth utilization metrics for each one of a set or two or more candidate seam locations, the ring bandwidth utilization metrics being representative of a utilization of overall bandwidth resources of the network;

identify an optimal seam location from among the set of candidate seam locations, based on the ring bandwidth utilization metrics; and implement a channel block at the optimal seam location;

wherein deriving the respective ring bandwidth utilization metrics comprises, for each ring node, calculating a respective set of predicted nodal bandwidth utilization metrics for each candidate seam location in the network, the nodal bandwidth utilization metrics being representative of a utilization of bandwidth resources of each ring node, and calculating a set of ring bandwidth utilization metrics for each candidate seam location in the network, based on the nodal bandwidth utilization metrics, and wherein identifying the optimal seam location comprises selecting an optimal one of the set of candidate seam location based on the calculated ring bandwidth utilization metrics.

12. The node of claim 11 wherein the optimal seam location is different from an existing seam location, and wherein the processor is further configured to send a message to a second node corresponding to the existing seam location, the message instructing the second node to release a channel block at the existing seam location.

13. The node of claim 11 wherein the node is a management server in communication with each ring node of the network.

14. The node of claim 13 wherein the node is configured to implement a channel block at the optimal seam location by:
identifying a ring node associated with the optimal seam location; and
communicating with the identified ring node to implement the channel block.

15. The node of claim 11 wherein the node is a ring node of the network.

16. The node of claim 14 wherein the node is further configured to:
calculate respective nodal bandwidth utilization metrics;
transmit its respective nodal bandwidth utilization metrics to each of the other ring nodes of the network;
receive respective nodal bandwidth utilization metrics from each of the other ring nodes of the network; and
calculate a respective set of ring bandwidth utilization metrics for each candidate seam location in the network, based on its respective nodal bandwidth utilization metrics and the nodal bandwidth utilization metrics received from each of the other ring nodes in the network.

17. The node of claim 14 wherein the node is configured to implement a channel block at the optimal seam point by:
identifying a new RPL Owner associated with the optimal seam location; and
determining whether it is the new RPL Owner, and if it is, implementing the channel block.

* * * * *